(12) United States Patent
Edenborg et al.

(10) Patent No.: US 7,478,756 B1
(45) Date of Patent: Jan. 20, 2009

(54) METHOD AND APPARATUS FOR PEN BASED DATA ENTRY AND STORAGE

(75) Inventors: Michelle Edenborg, Minnetonka, MN (US); Mark Gedlinske, Plymouth, MN (US); Doug Miller, Wyoming, MN (US); Damon E. Ray, Richfield, MN (US); Douglas A. Russell, Savage, MN (US); Darren G. Schachenmeyer, Jordan, MN (US); Doyle Kirkeby, Chanhassen, MN (US)

(73) Assignee: Data Recognition Corporation, Maple Grove, MN (US)

( * ) Notice: Subject to any disclaimer, the term of this patent is extended or adjusted under 35 U.S.C. 154(b) by 0 days.

(21) Appl. No.: 11/452,615

(22) Filed: Jun. 14, 2006

Related U.S. Application Data

(63) Continuation of application No. 10/792,658, filed on Mar. 3, 2004, now abandoned.

(60) Provisional application No. 60/452,236, filed on Mar. 4, 2003.

(51) Int. Cl.
*G06K 7/10* (2006.01)

(52) U.S. Cl. .............................. 235/472.03; 235/472.01

(58) Field of Classification Search ............ 235/472.03, 235/472.01, 472.02, 470, 462.49; 345/179; 434/322–323, 155; 382/179
See application file for complete search history.

(56) References Cited

U.S. PATENT DOCUMENTS

| | | | |
|---|---|---|---|
| 4,267,968 A | 5/1981 | Scott | |
| 4,708,503 A | 11/1987 | Poor | |
| 4,773,860 A | 9/1988 | Gannaway et al. | |
| 5,184,003 A * | 2/1993 | McMillin et al. ............ | 235/454 |
| 5,434,371 A | 7/1995 | Brooks | |
| 5,652,412 A | 7/1997 | Lazzouni et al. | |
| 5,672,060 A | 9/1997 | Poor | |
| 5,815,072 A | 9/1998 | Yamanaka et al. | |
| 5,915,973 A * | 6/1999 | Hoehn-Saric et al. ....... | 434/350 |
| 5,969,712 A | 10/1999 | Morita et al. | |
| 5,987,149 A | 11/1999 | Poor | |
| 6,081,261 A | 6/2000 | Wolff et al. | |

(Continued)

FOREIGN PATENT DOCUMENTS

GB          2390216          12/2003

(Continued)

OTHER PUBLICATIONS

U.S. Appl. No. 10/792,406 Final Office Action mailed Jul. 13, 2007, 9 pgs.

(Continued)

*Primary Examiner*—Edwyn Labaze
(74) *Attorney, Agent, or Firm*—Schwegman, Lundberg & Woessner, P.A.

(57) ABSTRACT

Method and apparatus for pen based data entry and storage are provided. In one approach a digital pen capable of electronically storing several written responses is used to record responses to forms, surveys, polls, or tests. In one approach a tablet PC capable of electronically storing several written responses and other responses is used to record responses to forms, surveys, polls, or tests. Various data processing and storage techniques are provided. Various data communications are provided. Various item types are provided for a number of different user responses.

20 Claims, 6 Drawing Sheets

U.S. PATENT DOCUMENTS

| | | | |
|---|---|---|---|
| 6,256,399 B1 | 7/2001 | Poor | |
| 6,366,935 B2 | 4/2002 | Hawkins et al. | |
| 6,446,871 B1 * | 9/2002 | Buckley et al. | 235/472.03 |
| 6,466,683 B1 | 10/2002 | Poor | |
| 6,539,101 B1 | 3/2003 | Black | |
| 6,577,846 B2 | 6/2003 | Poor | |
| 6,603,464 B1 * | 8/2003 | Rabin | 345/179 |
| 6,666,376 B1 | 12/2003 | Ericson | |
| 6,681,098 B2 * | 1/2004 | Pfenninger et al. | 434/362 |
| 6,695,216 B2 * | 2/2004 | Apperson | 235/494 |
| 6,703,570 B1 | 3/2004 | Russell et al. | |
| 6,751,351 B2 | 6/2004 | Knowles et al. | |
| 6,772,081 B1 | 8/2004 | Gedlinske et al. | |
| 6,789,191 B1 | 9/2004 | Lapstun et al. | |
| 6,820,096 B1 * | 11/2004 | Kanevsky et al. | 707/201 |
| 6,826,551 B1 | 11/2004 | Clary et al. | |
| 6,971,063 B1 * | 11/2005 | Rappaport et al. | 715/733 |
| 7,054,464 B2 | 5/2006 | Poor | |
| 7,091,959 B1 | 8/2006 | Clary | |
| 7,114,126 B2 * | 9/2006 | Berger et al. | 715/750 |
| 7,149,468 B2 | 12/2006 | Patz et al. | |
| 2001/0033293 A1 | 10/2001 | Hollstrom et al. | |
| 2002/0033414 A1 | 3/2002 | Fahraeus et al. | |
| 2002/0039722 A1 | 4/2002 | Lippman | |
| 2002/0079371 A1 | 6/2002 | Bobrow et al. | |
| 2002/0166895 A1 * | 11/2002 | Wiebe et al. | 235/472.01 |
| 2003/0011578 A1 | 1/2003 | Bergovist | |
| 2003/0038788 A1 | 2/2003 | Demartines et al. | |
| 2003/0086116 A1 | 5/2003 | Hall et al. | |
| 2003/0107558 A1 * | 6/2003 | Bryborn et al. | 345/179 |
| 2003/0122746 A1 | 7/2003 | Rignell | |
| 2003/0226069 A1 | 12/2003 | Legatt | |
| 2004/0061888 A1 * | 4/2004 | Braun et al. | 358/1.15 |
| 2004/0091847 A1 | 5/2004 | Creamer | |
| 2004/0121298 A1 * | 6/2004 | Creamer et al. | 434/322 |
| 2004/0124243 A1 * | 7/2004 | Gatto et al. | 235/487 |
| 2004/0134690 A1 * | 7/2004 | Norris et al. | 178/19.01 |
| 2004/0161728 A1 * | 8/2004 | Benevento et al. | 434/118 |
| 2005/0024346 A1 * | 2/2005 | Dupraz et al. | 345/179 |
| 2005/0243369 A1 * | 11/2005 | Goldstein et al. | 358/1.18 |
| 2006/0120605 A1 | 6/2006 | Poor | |
| 2006/0286539 A1 | 12/2006 | Tidwell-Scheuring et al. | |
| 2007/0065798 A1 | 3/2007 | Patz et al. | |

FOREIGN PATENT DOCUMENTS

| | | |
|---|---|---|
| WO | WO-01/61625 A2 | 8/2001 |
| WO | WO-01/61629 A2 | 8/2001 |
| WO | WO-01/61636 A2 | 8/2001 |
| WO | WO-01/75780 A1 | 10/2001 |
| WO | WO-01/75781 A1 | 10/2001 |

OTHER PUBLICATIONS

U.S. Appl. No. 10/792,406 Non Final Office Action mailed Sep. 28, 2006, 8 pgs.

U.S. Appl. No. 10/792,406 Response filed Dec. 28, 2006 to Non Final Office Action mailed Sep. 28, 2006, 7 pgs.

"Non-Final Office Action for U.S. Appl. No. 10/792,658", (Jun. 15, 2006), 10 pgs.

Edenborg, Michelle, et al., "Method and Apparatus for Pen Based Data Entry and Storage", U.S. Appl. No. 10/792,406, filed Mar. 3, 2004, 20 pgs.

Edenborg, Michelle, et al., "Method and Apparatus for Pen Based Data Entry and Storage", U.S. Appl. No. 60/452,236, filed Mar. 4, 2003, 16 pgs.

"U.S. Appl. No. 10/792,406 Non-Final Office Action mailed Mar. 4, 2008", OARN,2 pgs.

"U.S. Appl. No. 10/792,406 Response filed Dec. 13, 2007 to Final Office Action mailed Jul. 13, 2007", 9 pages.

Edenborg, Michelle, et al., "Method and Apparatus for Pen Based Data Entry and Storage", U.S. Appl. No. 10/792,658, filed Mar. 3, 2004, 17 pgs.

* cited by examiner

NAME: LAST, FIRST

*Smith,* *Joe* ~ 50

AGE: DARKEN THE PROPER CIRCLES

⓪ ⓪
● ①
② ②
③ ③
④ ④
⑤ ●
⑥ ⑥
⑦ ⑦
⑧ ⑧
⑨ ⑨

} 54

CLASS: CIRCLE ONE
(FR) SO JR

FAVORITE ACTIVITIES: *I like fishin* *iking.* ~ 52

*Fig. 6*

METHOD AND APPARATUS FOR PEN BASED DATA ENTRY AND STORAGE

CROSS-REFERENCE TO RELATED APPLICATION(S)

This application is a continuation of U.S. application Ser. No. 10/792,658, filed Mar. 3, 2004, now abandoned which claims the benefit of U.S. Provisional Application Ser. No. 60/452,236, filed Mar. 4, 2003, under 35 U.S.C. 119(e). These applications are incorporated herein by reference.

FIELD OF THE INVENTION

This invention relates generally to responses written by hand and in particular to method and apparatus for pen based data entry and storage.

BACKGROUND

The difficulties of recording and storing hand written entries are well known. Limited numbers of writings on paper can be readily scanned electronically and stored in a computer memory. Such scanning can also be done for a number of documents, but the scanning process can become difficult and complicated, since each document must be scanned and identified in a file structure for access. Among other things, the sheer collection of paper can be a daunting task.

The scanning of paper forms also becomes difficult when markings are not easily scanned by the scanning hardware or are too light for proper scanning.

These problems are magnified when electronic scanning is used in the areas of standardized testing, polling and surveys, and the use of forms in general. In situations where forms are meant to be "read" various stray markings, incomplete entries, and other entry errors can complicate the process.

What is needed in the art is a method and apparatus for storing writings that overcomes the foregoing problems.

SUMMARY

Method and apparatus for pen based data entry and storage are provided. In one approach a digital pen capable of electronically storing several written responses is used to record responses to forms, surveys, polls, or tests. In one approach a tablet PC capable of electronically storing several written responses and other responses is used to record responses to forms, surveys, polls, or tests. Various data processing and storage techniques are provided. Various data communications are provided. Various item types are provided for a number of different user responses.

This Summary is an overview of some of the teachings of the present application and not intended to be an exclusive or exhaustive treatment of the present subject matter. Further details about the present subject matter are found in the detailed description and appended claims. Other aspects of the invention will be apparent to persons skilled in the art upon reading and understanding the following detailed description and viewing the drawings that form a part thereof, each of which are not to be taken in a limiting sense. The scope of the present invention is defined by the appended claims and their equivalents.

BRIEF DESCRIPTION OF THE DRAWINGS

FIG. 6 shows one type of sample form that employs a variety of inputs that are readable with the present system according to one embodiment of the present system.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. The following detailed description provides examples, and the scope of the present invention is defined by the appended claims and their equivalents.

It should be noted that references to "an", "one", or "various" embodiments in this disclosure are not necessarily to the same embodiment, and such references contemplate more than one embodiment.

With recent advancements in technology it is now possible to write notes with electronic pens that transfer the writings to a computer for storage and processing of the written information. One such device is the LOGITECH IO PERSONAL DIGITAL PEN, by LOGITECH INTERNATIONAL, Fremont Calif. Such devices use a tiny camera to record a pattern of dots on specially designed paper for recording motion of the pen. In varying models, the pen is used to write notes on the special paper and then placed in a dock that connects the pen to a personal computer. In one such implementation, the pen is used with a USB port to transfer the contents of memory which has the pen's motion recorded. The resulting writing may be pasted into several applications and can be processed with handwriting recognition software to convert writing into text.

Other workers in the field have provided writing devices which use handwritten entries, such as the IBM CROSSPAD, by IBM, Armonk, N.Y. This device is an electronic notepad connected to an IBM laptop for capturing written notes. Another device series is the PALM PILOT series by PALM, Inc., Milpitas, Calif. Yet another device is the Tablet PC, examples of which are manufactured by several companies, including but not limited to: Acer, Compaq, Fujitsu, ViewSonic, Electrovaya, Toshiba, Gateway, Motion Systems, and others. Several other writing devices are possible which may be employed to store the written text.

Figure 1:
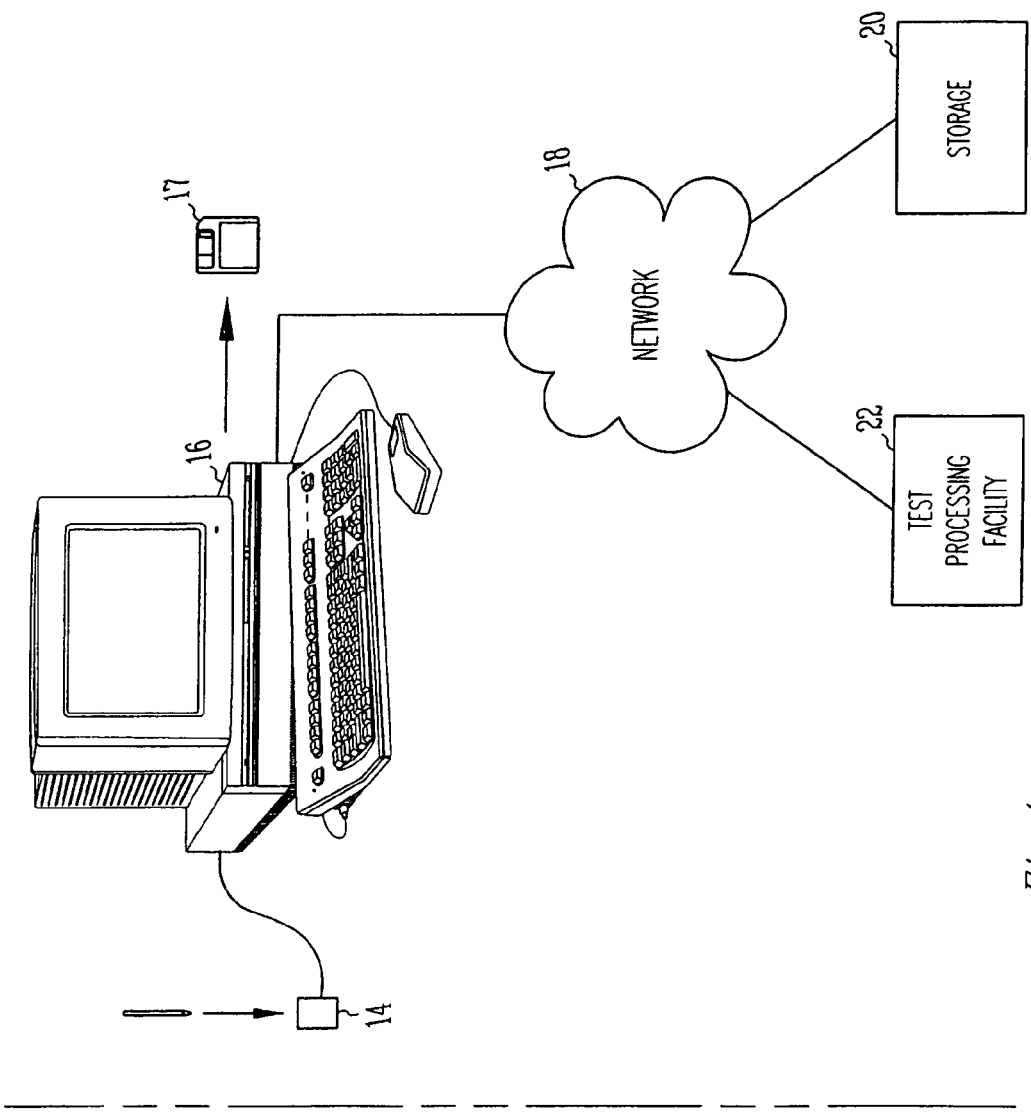
FIG. 1 is a diagram showing one application of a digital pen according to one embodiment of the present application.
Figure 1:
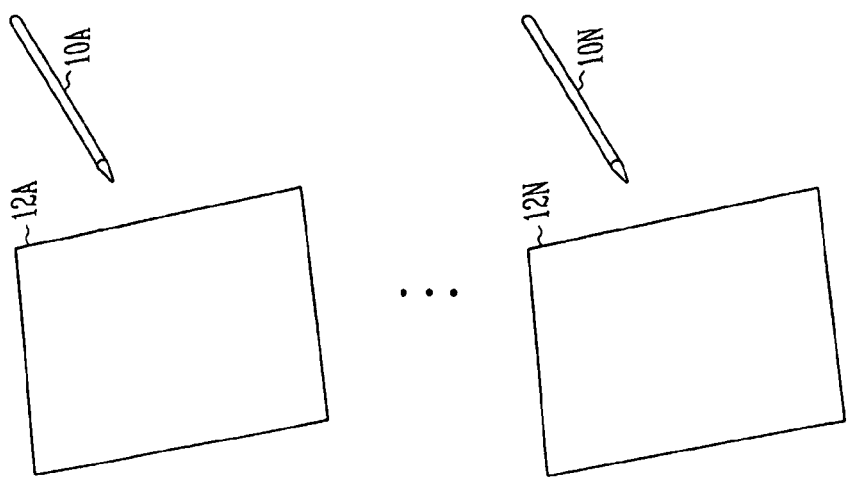

FIG. 1 is a diagram showing one application of a digital pen according to one embodiment of the present application. In one embodiment, digital pen 10A is used with paper 12A for recording answers. In an embodiment employing a pen with optical reading means for determining the pen motion, paper 12A is coded with readable markings to make the position of the pen recordable. In one embodiment, the pen is used and placed within reader 14 for a download of the writing information to personal computer (PC) 16. In one embodiment, several pens 10A to 10N are used to record responses from a plurality of persons. The pens 10A-10N are identified to individual users and the downloaded information is saved with the name or other identifying information of each user. Computer 16 is capable of storing pen data in its memory. Computer 16 may also transmit the pen data to offsite storage 20 over network 18. In one application, the offsite storage 20 is a repository of responses. In one application, storage 20 is used for archiving the responses. Other uses of storage 20 are possible without departing from the scope of the present system. Storage 20 may be a single computer connected to network 18 or a plurality of computers connected to network 18. In one application, storage 20 is a database with secure access points for storage of the responses. In one application, storage 20 is a plurality of disparate databases with secure access for storage of the responses.

In one embodiment, computer 16 transmits pen data directly to test processing facility 22. In various embodiments, test processing facility 22 receives information from computer 16 and from storage 22. Test processing facility 22 evaluates the responses for the tests, surveys, or polls. Test processing facility 22 can produce written reports. Test processing facility 22 can also electronically send reports over the network 18 to various destinations, such as storage 20 or computer 16. Other destinations and outputs are possible without departing from the present system.

In such embodiments it may be advantageous to use encryption or other forms of secure transmissions. In one embodiment, network 18 is an intranet. In one embodiment, network 18 is connected to the INTERNET. In various embodiments, a direct dialup connection is employed. In various embodiments, a virtual private network is employed for transmission of data. In various embodiments, the information is transmitted using electronic mail. In various embodiments, a secure socket layer is employed to make the communications.

In one embodiment, computer 16 transmits raw pen data. In one embodiment, computer 16 preprocesses the raw pen data before transmission. In varying embodiments, handwriting recognition is used to process the raw pen data. In one embodiment, software designed to perform mark recognition is used to determine a particular response in a multiple response format.

It is understood that a number of connections are possible within the scope of the present system, including, but not limited to, intranetwork connections, INTERNET connections, phone line connections, wireless connections, dedicated lines, and combinations thereof.

In varying embodiments, the information on computer 16 is transmitted to diskette 17 for storage and/or transport. Any variety of storage devices may be employed, including, but not limited to CD-ROM, DVD, ZIP Drive, tape memory, and other memory, such as flash memory.

In one embodiment, where LOGITECH IO pens are used for digital pens 10A-10N, questions are preprinted on the readable paper 12A-12N. Answers are recorded as responses by the digital pens 10A-10N. After the answers are taken, the digital pens 10A-10N are placed in reader 14 such that the responses are recorded by computer 16. In one embodiment, computer 16 is programmable to pass the documents to another location, such as storage 20 or test processing facility 22.

FIG. 6 shows one type of sample form that employs a variety of inputs that are readable with the present system according to one embodiment of the present system. The present system is designed to be flexible and variable. For instance, FIG. 6 shows that the responses may be of a written entry, such as in name block 50, or essay block 52. Or for a fill-in-the selection approach, the form may employ circles to be marked, such as circles 54. The example shows that circles 1 and 5 are filled in such that the age of the respondent is 15. Alternately, the responses may be in a form that is dependent on creating a shape on the page, such as circling the entry demonstrated by 56, which shows that Joe Smith is a freshman. Those skilled in the art, upon reading and understanding the present application, will appreciate that other forms of entry may be made without departing from the scope of the present system.

Figure 2:
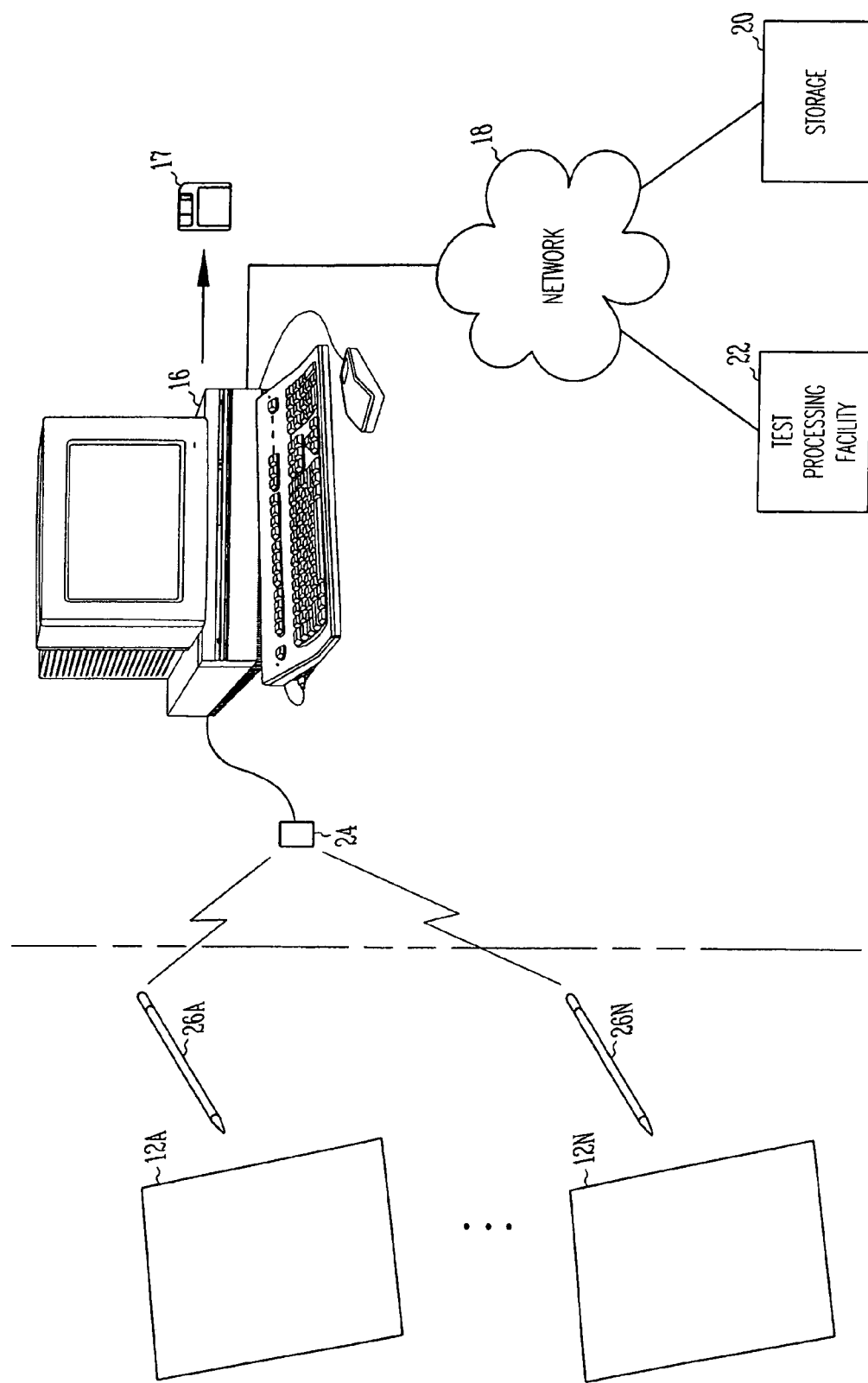
FIG. 2 is a diagram showing one application of a digital pen with wireless communications according to one embodiment of the present application.

FIG. 2 is a diagram showing one application of a digital pen with wireless communications according to one embodiment of the present application. In this embodiment, wireless communications are made from digital pens 26A-26N to antenna 24. In one embodiment, digital pens 26A-26N transmit information to computer 16 continuously. In one embodiment, digital pens 26A-26N transmit information to computer 16 periodically. In various alternate embodiments, digital pens 26A-26N transmit information when polled by computer 16 in a bidirectional communication. In various embodiments, digital pens 26A-26N transmit information when a memory limit is reached. Those skilled in the art upon reading and understanding the subject matter provided herein will appreciate that other transmission schemes may be employed without departing from the scope of the present system.

Figure 3:
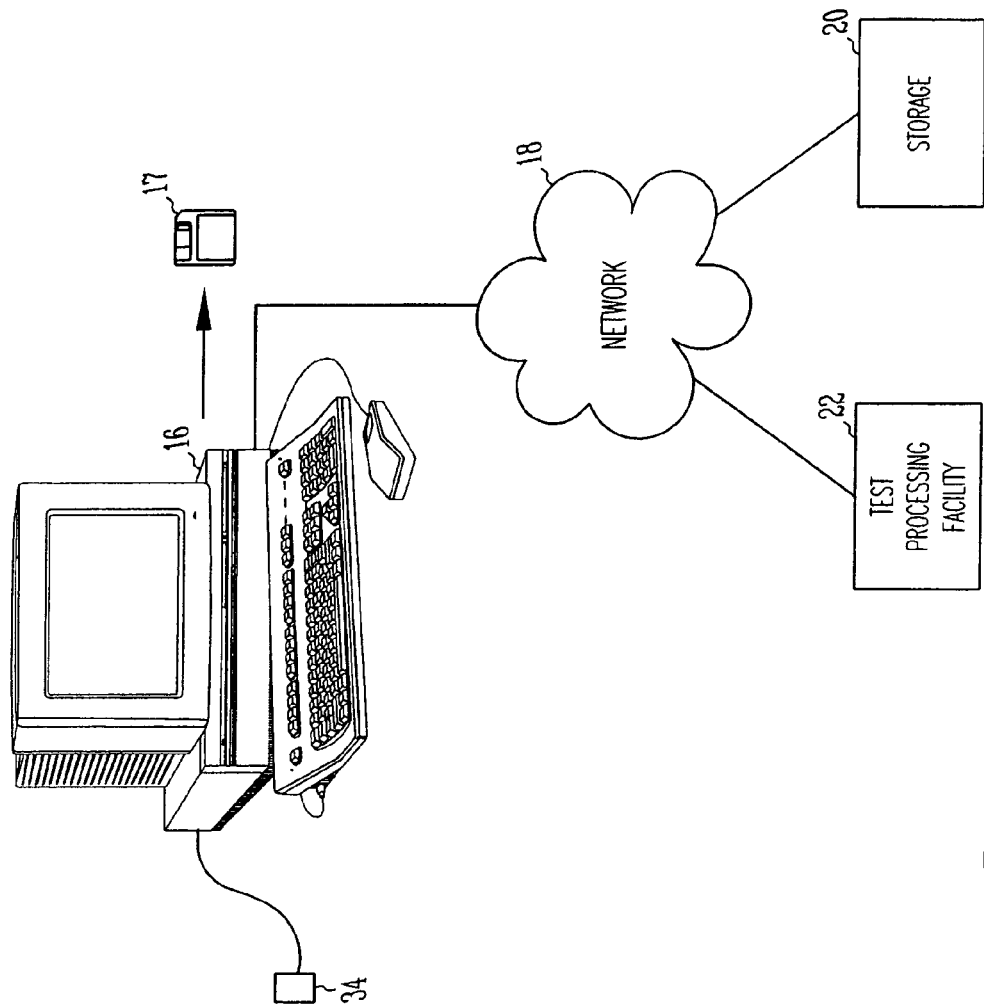
FIG. 3 is a diagram showing one application of a tablet pc according to one embodiment of the present application.
Figure 3:
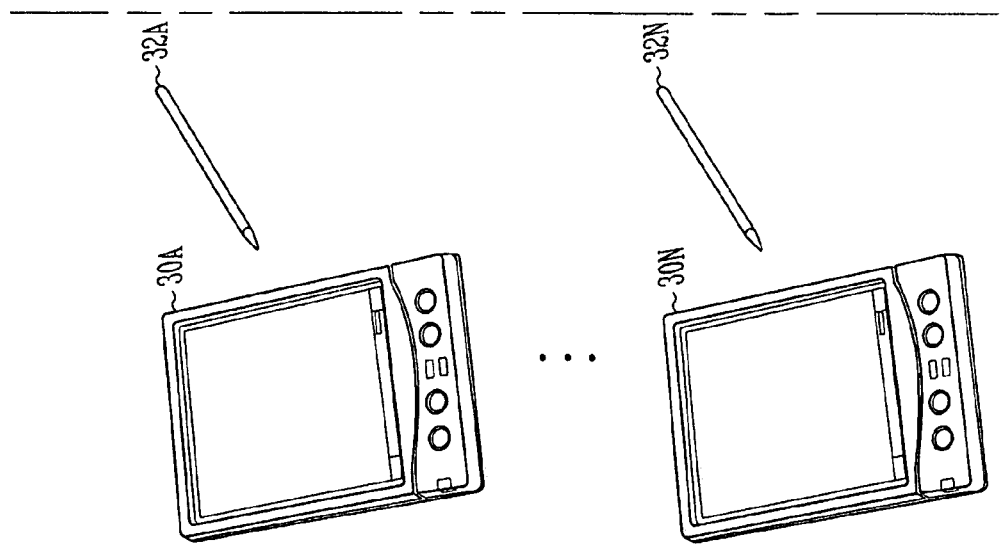
Figure 5:
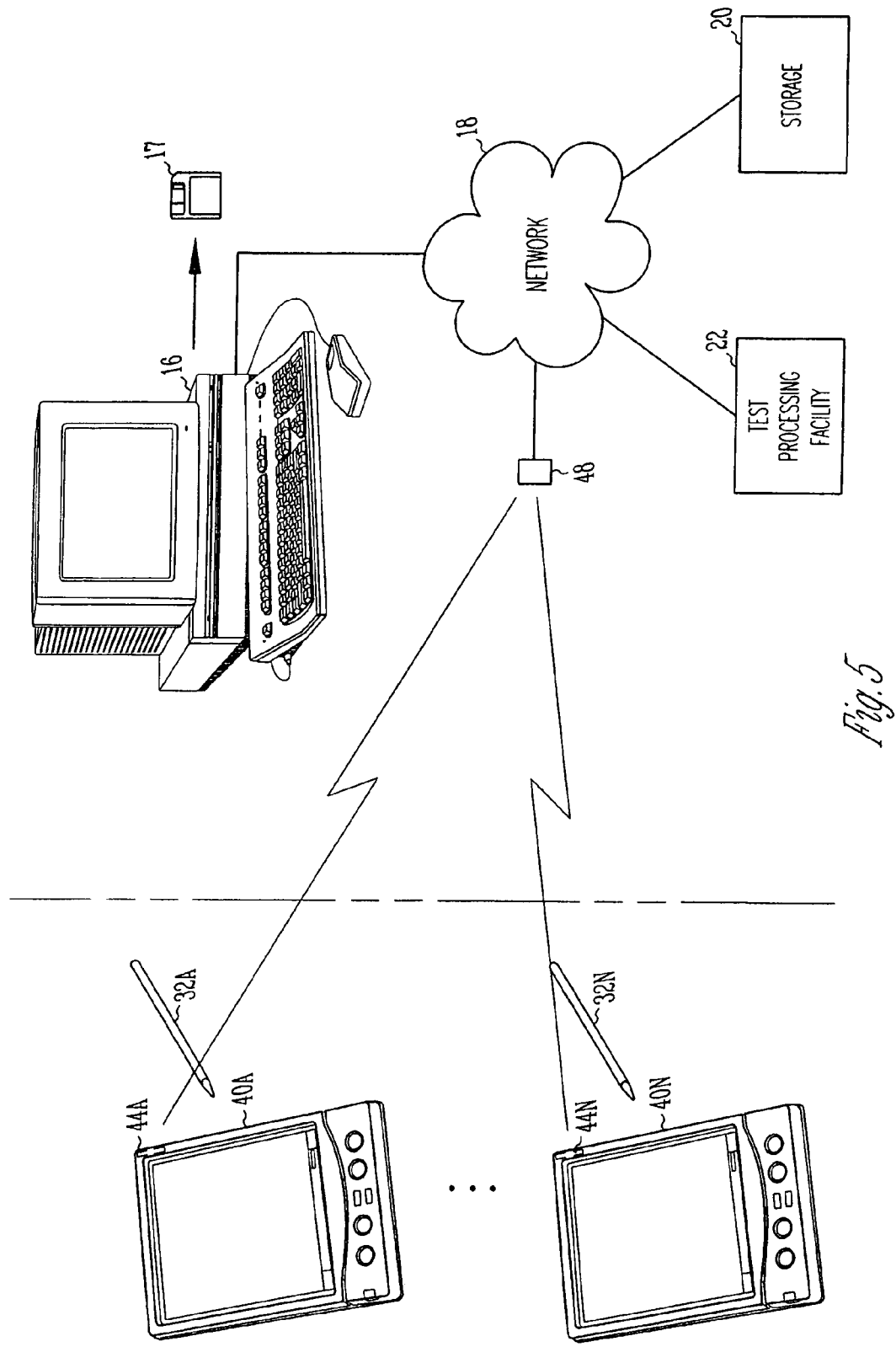
FIG. 5 is a diagram showing one application of a tablet pc with wireless communications according to one embodiment of the present application.

FIG. 3 is a diagram showing one application of a tablet personal computer (PC) according to one embodiment of the present application. Tablet PC 30A is preprogrammed with questions for responses by a user. Tablet PC provides for a variety of pen based inputs by stylus 32A. In one embodiment the response types demonstrated by FIG. 5 are requested of the user and the responses are saved in the tablet PC 30A. The response forms may be a survey, poll, test, or other query that is presentable on the screen of tablet PC 30A and which may be recorded using the stylus 32A, by buttons on the tablet PC 30A, or by other means, including but not limited to audio recordings, audible commands, optical recordings, optical commands, position recordings, positional commands.

In various examples, a surface of a tablet PC 30A is masked by a sheet, and the tablet PC records information marked on the sheet. In some examples, the sheet is preprinted stationary, and in others, it is blank stationary. Various embodiments include a sheet which is opaque, transparent, or semi-transparent. In one example, the sheet is a transparency film. In various embodiments, a stylus 32A is suited for marking the sheet, and in one example, the stylus is an ink-pen. In varying examples, the tablet PC is pressure sensitive, and digitally records markings made to the sheet by recording physical information component to sheet marking. In other embodiments, the tablet PC uses other methods of digitally recording stylus movement during marking. In one example, the stylus 32A communicates marking information electronically with the tablet PC 30A, and the tablet PC 30A records the markings. Once the tablet PC records the markings, in varying embodiments, mark recognition is used to process the data. In one embodiment, software designed to perform mark recognition is used to determine a particular response located among multiple responses. Thus, embodiments of the combined tablet PC 30A and the sheet produce both a marked sheet and a digital replica of the sheet markings. Said marked sheet, in various examples, is useful for verification of digitally recorded data, and, in various embodiments, is scanned and stored on a digital network for this use. It should be noted that the present subject matter is not limited to a tablet PC, but can also include a PDA, or other electronic device capable of recording marks to a surface.

In one example, in embodiments where tablet PC 30A includes an audio recording feature, a digitally sampled response is recorded for later transmission to PC 16 via receptacle 34.

As an example of audible commands, in one embodiment, audible commands are spoken by the user to respond to different items as programmably requested by PC 30A. For example, the screen could prompt a user to speak the name of an animal displayed on the screen and record the response with speech recognition software. Such prompts may be audible or visual or both.

In one embodiment, optical recordings are performed using a camera to record various requested items. For example, the tablet PC 30A may prompt the user to take a picture of herself, resulting in a stored image of the person responding to the survey, poll, test or other form.

In one embodiment, optical commands are requested from the user. For example, in one embodiment image recognition is used to determine the user's facial expression to various items presented by the tablet PC 30A and detect emotional responses to various images or sounds or both presented to the user.

In one embodiment, tablet PC 30A includes a global positioning satellite (GPS) system or other positioning system to determine a user's location, motion, velocity, acceleration, path, or other spatial determination. For example, the user may respond to certain items presented by tablet PC 30A by moving toward an object requested by the tablet PC 30A.

In one embodiment, tablet PC 30A includes a global positioning satellite (GPS) system or other positioning system to accept positional responses from a user. For example, a user may be prompted to point the tablet PC 30A in a direction they wish to travel, thereby initiating a process in the tablet PC 30A based on direction.

Those skilled in the art, upon reading and understanding the present teachings, will appreciate that a number of responses are accommodated by the present system. The examples provided here are not intended in a limiting or exclusive sense, but are intended to demonstrate the programmability and flexibility of the present system.

The responses are transferred to the network 18, storage 20, and test processing facility 22 in any variety of transmission means, including, but not limited to those presented above for FIGS. 1 and 2. The resulting data is protected and used by a variety of means, including, but not limited to those presented above for FIGS. 1 and 2.

The tablet PC 30A also lends itself to testing, polling, or surveying a plurality of users, as demonstrated by tablet PCs 30A-30N. Thus, a plurality of users are accommodated with the present system. Each user can identify herself with a variety of means, including, but not limited to biometric means (including, but not limited to, fingerprint reading, eye scans, or DNA reading), hand entry of information (including, but not limited to name, social security number, or test ID number), or other electronic identification (including, but not limited to card swipe, rf tagging, smart card, photograph, or other form of electronic ID).

Figure 4:
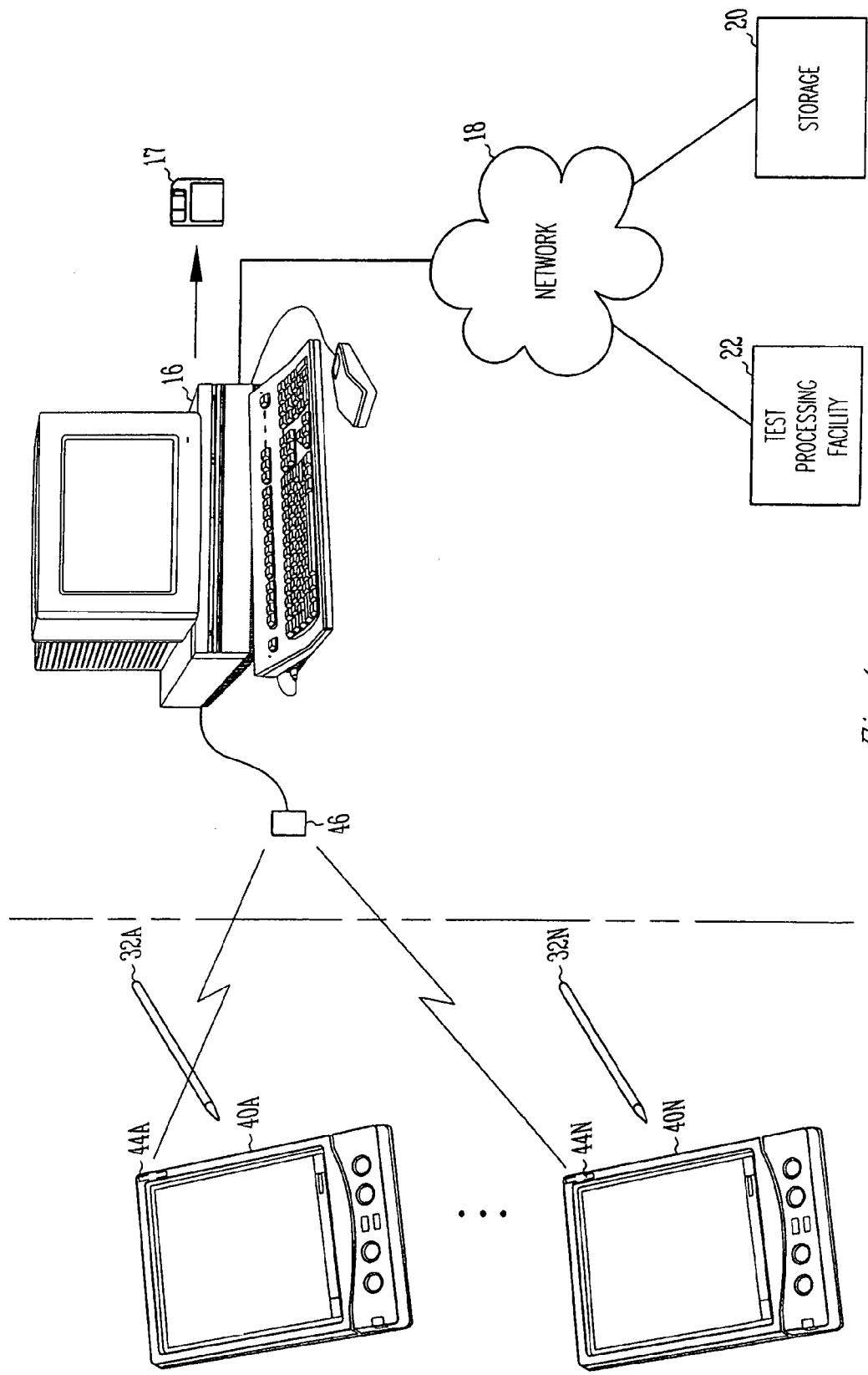
FIG. 4 is a diagram showing one application of a tablet pc with wireless communications according to one embodiment of the present application.

FIG. 4 is a diagram showing one application of a tablet PC with wireless communications according to one embodiment of the present application. In this embodiment, tablet PC 40A includes a wireless interface 44A for unidirectional or bidirectional communications with another wireless device. In FIG. 4, the wireless module 46 is connected to PC 16 for communication of responses. FIG. 5 shows yet a different embodiment whereby the wireless interface 44A communicates to a wireless router or other network based device. Such communications afford the user an ability to bypass computer 16 and communicate directly with a remote computer, such as one located at test processing facility 22 or at storage 20.

In alternate embodiments and applications tablet PC 44A is capable of wireless communications with tablet PC 44N.

It is understood that the handwritten responses of the foregoing are reproduced without additional processing on various embodiments. In varying embodiments, handwriting recognition software is employed. Different combinations of actual writings and handwriting recognition are employed in multiple embodiments.

Thus a variety of communication pathways are demonstrated with the foregoing embodiments. It is also understood that the system affords a variety of programmable items for various responses as demonstrated by the examples provided herein.

It is to be understood that the above description is intended to be illustrative, and not restrictive. Other embodiments will be apparent to those of skill in the art upon reviewing and understanding the above description. The scope of the invention should, therefore, be determined with reference to the appended claims, along with the full scope of equivalents to which such claims are entitled.

What is claimed is:

1. A method for recording responses from a user, comprising:
   providing the user a tablet PC;
   presenting a standardized test including a plurality of items to the user;
   masking the tablet PC with the standardized test;
   recording digital handwritten responses to the plurality of items with the tablet PC; and
   transferring the responses to a remote computer,
   wherein the tablet PC includes a stylus and the stylus marks responses to the items on the standardized test that are recorded by the tablet PC.

2. The method of claim 1, further comprising transferring the digital handwritten responses to a remote computer over the internet.

3. The method of claim 1, further comprising processing the digital handwritten responses into a report.

4. The method of claim 3, further comprising transferring the report to a remote computer over the internet.

5. The method of claim 1, further comprising masking the tablet PC with an opaque standardized test.

6. The method of claim 1, further comprising masking the tablet PC with a semi-transparent standardized test.

7. The method of claim 1, further comprising masking the tablet PC with a paper preprinted standardized test.

8. The method of claim 1, further comprising masking the tablet PC with a standardized test preprinted on a transparency film.

9. The method of claim 1, further comprising performing mark recognition on the paper responses and digitally recording digital paper responses outputted from the mark recognition.

10. The method of claim 1, further comprising prompting the user to input identification information with the stylus.

11. The method of claim 10, wherein the identification information includes a hand written user name.

12. The method of claim 1, further comprising scanning the standardized test to produce a scanned standardized test.

13. The method of claim 12, further comprising archiving the scanned standardized test.

14. The method of claim 12, further comprising verifying the responses using the scanned standardized test.

15. The method of claim 12, further comprising performing mark recognition on the scanned standardized test.

16. The method of claim 12, further comprising transferring the scanned standardized test to a remote computer over the internet.

17. The method of claim 1, further comprising processing the digital handwritten responses into a first report and further comprising performing mark recognition on the standardized test.

18. The method of claim 17, further comprising comparing the first report to the mark recognition of the standardized test and generating a verification report.

19. The method of claim 18, further comprising storing the verification report.

20. The method of claim 1, further comprising archiving the standardized test having marked paper responses.

* * * * *